(12) United States Patent
Goldman (10) Patent No.: US 8,142,668 B2
(45) Date of Patent: Mar. 27, 2012

(54) METHOD FOR SELECTIVE PARTITION CAPACITY BASED FILTERING

(75) Inventor: Michael A. Goldman, Sunrise, FL (US)

(73) Assignee: Mechanical Manufacturing Corp., Sunrise, FL (US)

(*) Notice: Subject to any disclaimer, the term of this patent is extended or adjusted under 35 U.S.C. 154(b) by 0 days.

(21) Appl. No.: 13/171,606

(22) Filed: Jun. 29, 2011

(65) Prior Publication Data

US 2011/0259837 A1     Oct. 27, 2011

Related U.S. Application Data

(62) Division of application No. 11/874,735, filed on Oct. 18, 2007, now Pat. No. 7,993,520.

(51) Int. Cl.
*B01D 37/00* (2006.01)
*C02F 1/00* (2006.01)
*B01D 29/00* (2006.01)

(52) U.S. Cl. ............... 210/806; 210/767; 210/335

(58) Field of Classification Search .......... None
See application file for complete search history.

(56) References Cited

U.S. PATENT DOCUMENTS

| | | | |
|---|---|---|---|
| 2,386,684 A * | 10/1945 | Hermanson | 210/489 |
| 3,260,370 A | 7/1966 | Schwartzwalder | |
| 3,787,277 A | 1/1974 | Oomen et al. | |
| 4,181,514 A | 1/1980 | Lefkowitz et al. | |
| 4,371,376 A | 2/1983 | Dick, Jr. | |
| 4,594,162 A | 6/1986 | Berger | |
| 4,842,739 A | 6/1989 | Tang | |
| 4,863,602 A | 9/1989 | Johnson | |
| 4,921,606 A | 5/1990 | Goldman | |
| 5,053,125 A | 10/1991 | Willinger et al. | |
| 5,246,581 A | 9/1993 | Goldman | |
| 5,755,962 A | 5/1998 | Gershenson et al. | |

(Continued)

FOREIGN PATENT DOCUMENTS

WO    WO-91 08037 A1    6/1991

(Continued)

OTHER PUBLICATIONS

Information about Related Patents and Patent Applications, see section 6 of the accompanying Information Disclosure Statement Letter, which concerns Related Patents and Patent Applications.

*Primary Examiner* — Benjamin Kurtz
(74) *Attorney, Agent, or Firm* — Fox Rothschild, LLP; Robert J. Sacco (57) ABSTRACT

A method is provided for filtering a fluid. The method includes the step of selecting a first surface filtration medium to include layers of a first mesh material (FMM). The method also includes the step of selecting a second surface filtration medium to include layers of a second mesh material (SMM). The layers of FMM are selected to include a first number of layers (FNL) for collectively providing a first absolute micron filter rating (FAMFR) and a first capacity for collecting a first type of particles. The layers of SMM are selected to include a second number of layers (SNL) different from the FNL. The SNL is selected for collectively providing a second absolute micron filter rating (SAMFR). The SAMFR is different from the FAMFR. The SNL is also selected for providing a second capacity for collecting a second type of particles. The second capacity is different from the first capacity.

19 Claims, 5 Drawing Sheets

U.S. PATENT DOCUMENTS

| | | |
|---|---|---|
| 5,762,797 A | 6/1998 | Patrick et al. |
| 5,770,077 A | 6/1998 | Goldman |
| 5,910,247 A | 6/1999 | Outterside |
| 6,110,249 A | 8/2000 | Medcalf et al. |
| 6,274,041 B1 | 8/2001 | Williamson et al. |
| 6,371,645 B1 | 4/2002 | Rusert et al. |
| 6,391,200 B2 | 5/2002 | Pulek et al. |
| 6,692,637 B2 | 2/2004 | Fox et al. |
| 6,726,751 B2 | 4/2004 | Bause et al. |
| 6,746,760 B2 | 6/2004 | Minemura et al. |
| 6,908,550 B2 | 6/2005 | Silverstein |
| 6,966,939 B2 | 11/2005 | Rammig et al. |
| 6,998,155 B2 | 2/2006 | Haggquist et al. |
| 2001/0004061 A1 | 6/2001 | Popoff et al. |
| 2006/0096910 A1 | 5/2006 | Brownstein et al. |
| 2006/0231480 A1* | 10/2006 | Palacios Donaque ........ 210/437 |
| 2007/0175817 A1 | 8/2007 | Goldman |
| 2009/0107930 A1 | 4/2009 | Goldman |

FOREIGN PATENT DOCUMENTS

| | | |
|---|---|---|
| WO | WO-03/045532 A1 | 6/2002 |
| WO | WO-02/095112 A1 | 11/2002 |

\* cited by examiner

FROM FIG. 1A

DETERMINE A SECOND NUMBER OF LAYERS OF A SECOND MESH MATERIAL REQUIRED FOR PROVIDING A SECOND SURFACE FILTRATION MEDIUM, WHERE THE SECOND NUMBER OF LAYERS IS DETERMINED USING THE RATIO COMPUTED IN STEP 116 OF FIG. 1A
118

SELECT A SECOND MESH MATERIAL FOR PROVIDING AN ABSOLUTE MICRON RATED (AMR) SECOND SURFACE FILTRATION MEDIUM A WHEN THE SECOND NUMBER OF LAYERS OF THE SECOND MESH MATERIAL ARE ARRANGED IN A STACK, WHERE THE SECOND MESH MATERIAL HAS A PORE SIZE AND MICRON RATING GREATER THAN A LOWER LIMIT OF A SIZE RANGE OF A SECOND TYPE OF PARTICLE TO BE FILTERED 120

CREATE A SECOND SURFACE FILTRATION MEDIUM BY ARRANGING THE SECOND NUMBER OF LAYERS OF SECOND MESH MATERIAL IN A STACK
122

FORM A CAPACITY BASED FILTER MEDIA BY JOINING THE FIRST AND SECOND SURFACE FILTRATION MEDIUMS TOGETHER USING ANY TECHNIQUE KNOWN IN THE ART, SUCH AS AN ULTRASONIC WELDING TECHNIQUE
124

PUMP (OR PASS) A CONTAMINATED FLUID THROUGH THE CAPACITY BASED FILTER MEDIA
126

END 128

METHOD FOR SELECTIVE PARTITION CAPACITY BASED FILTERING

CROSS REFERENCE TO RELATED APPLICATIONS

This applications claims the benefit of, and is a divisional application of, U.S. application Ser. No. 11/874,735, filed on Oct. 18, 2007, and which is herein incorporated in its entirety.

BACKGROUND OF THE INVENTION

1. Statement of the Technical Field

The invention concerns a method for filtering particles from a fluid. More particularly, the method concerns a method for filtering particles of two or more size ranges, and having different relative concentrations.

2. Description of the Related Art

A filter typically consists of a cartridge or bag for use in a pressurized filter system. A pressurized filter system utilizing filter bags is typically comprised of a filter housing having a body and a cover. The body contains a filter basket for placing the filter bag therein. The filter housing is comprised of a mounting stand, an input orifice and an output orifice. A contaminated fluid is pumped into the filter housing through the input orifice. The contaminated fluid contains one or more types of particles to be filtered (PTBFs). Each type of PTBF has a different particle size. The contaminated fluid also contains different concentrations of each PTBF type. The PTBFs are filtered from the contaminated fluid as the fluid flows through the filter bag and then exists through the output orifice. Such a pressurized filter system is disclosed in U.S. Pat. No. 5,246,581.

Fluids to be filtered often contain various types of particles which are to be removed by the filtering operation. For example, a first type of particles may have a first range of particle sizes, whereas a second type of particulate may have a second range of particle sizes. Filtration apparatus such as filter bags or filter cartridges can be specially designed for these types of filtering operations. A filter bag or cartridge can often include a first type of filter material intended to filter the first type of particle, and a second type filter material intended to filter the second type of particle. For example, the first filter material can be designed to capture relatively large particles of the first type whereas the second filter material can be selected to capture relatively smaller particles of the second type. The first and second filter materials are commonly arranged in layers through which the fluid is passed. These arrangements can be quite effective for efficiently filtering the two different particle types.

Still, there are problems which tend to arise when attempting to filter various different types of particles contained in a fluid. For example, the concentration of the various different types of particles may be different. The concentration of the first type of particle within the fluid can be much higher as compared to the second type of particle. Stated differently, the two or more particle streams have different percentages of concentration and different weights. Alternatively, the concentration of the second type of particle might be much higher as compared to the first type of particle. Over time, this difference in particle concentration will generally result in a larger quantity of one particle type or the other being collected in the filter.

Significantly, each filter material will have a limited capacity or capability to capture particulate matter. After this capacity is reached, the filter can become so heavily laden with filtered particulate matter that the flow rate of fluid through the filter material is substantially diminished. This condition is sometimes referred to as blinding. When a first type of particle is captured in a first filter material layer and a second type of particle is captured in a second filter material layer, one filter material layer may become blinded before the other. For example, a concentration of a first particle type can be ten times higher as compared to a second particle type. In such cases, a first filter material for capturing the first particle type might become blinded at a rate that is ten times faster as compared to a second filter material for capturing a second particle type. Notably, the filter bag or cartridge must be replaced once any of the filter materials layers becomes blinded, even if other filter materials comprising the filter bag or cartridge still have additional capacity. This is due to the fact that the filter material layers are arranged serially. If one layer is clogged with particles, the other layers will no longer function effectively.

The foregoing problem can result in a shortened life cycle for a filter bag or cartridge. A single layer of filter material, once clogged, can effectively require replacement of the entire filter bag. Accordingly, there is a need for an improved filter bag in which the life of filter mediums provided for particles having different types and concentrations is more effectively equalized.

SUMMARY OF THE INVENTION

A method is provided for filtering a fluid. The method includes the step of selecting a first surface filtration medium to include layers of a first mesh material (FMM). The layers of FMM are arranged in a stack. The method also includes the step of selecting a second surface filtration medium to include layers of a second mesh material (SMM). The layers of SMM are also arranged in the stack. The layers of FMM are selected to include a first number of layers for collectively providing a first absolute micron filter rating and a first capacity for collecting a first type of particles. The layers of SMM are selected to include a second number of layers for collectively providing a second absolute micron filter rating and a second capacity for collecting a second type of particles. The second number of layers is different from the first number of layers. Likewise, the second absolute micron filter rating is different from the first absolute micron filter rating. Similarly, the second capacity is different from the first capacity.

According to an aspect of the invention, a ratio is determined using a concentration value of the first type of particles and a concentration value the second type of particles. The second number of layers is selected using the determined ratio.

According to another aspect of the invention, the number of layers of the first and second mesh materials are selected to provide a useful life expectancy of the first surface filtration medium approximately equal to a useful life expectancy of the second surface filtration medium when filtering a known fluid having substantially unequal concentrations of the first and second type of particles.

According to another aspect of the invention, the number of layers of the second mesh material is selected using a known linear or non-linear relationship between particle concentrations and life expectancies of multilayer surface filtration mediums. Alternatively, the number of layers of the second mesh material is selected using known life expectancies of multilayer surface filtration mediums.

According to another aspect of the invention, the first number of layers is selected using a mathematical equation $AMR = 0.72^{n-1} \cdot p$, where AMR is an absolute micron rating, p is a predetermined pore size, and n is a number of layers. The first mesh material is selected to have a predetermined pore size larger than a highest limit value of a size range of the first type of particles. The first predetermined pore size is selected to be to be larger than the first absolute micron filter rating. The first absolute micron filter rating is selected to have a value less than or equal to a lowest limit value of a size range of the first type of particles.

According to yet another aspect of the invention, the second mesh material is selected to have a predetermined pore size larger than a highest limit value of a size range of the second type of particles. The second predetermined pore size is selected to be larger than the second absolute micron filter rating. The second absolute micron filter rating is selected to have a value less than or equal to a lowest limit value of a size range of the second type of particles. If the predetermined pore size of the first mesh material is larger than a predetermined pore size of the second mesh material, then the first surface filtration medium may be placed downstream from the second surface filtration medium.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The invention concerns a method for designing a filter. The invention also concerns a method for filtering a fluid using a capacity based filter media. The capacity based filter media is designed in accordance with particle profiles. Each particle profile includes a particle type and a particle size range. The capacity based filter media is also designed in accordance with particle concentrations. The phrase "particle concentration" as used herein refers to the amount of a particle type existing within a fluid to be filtered. The capacity based filter media includes two or more stacks of surface filtration mediums. The phrase "surface filtration medium" as used herein refers to a medium that relies on the direct interception to trap particles and achieves filtration on a single plane. Each stack is provided to filter a particular particle type from the fluid. The stacks of surface filtration mediums are selectively designed to have the same or substantially similar life expectancies. Stated differently, the stacks experience blinding at approximately the same point in time regardless of different concentrations of particle types in the fluid. The term "blinding" as used herein refers to the clogging of a filtration medium to an extent that a fluid flow rate through the filtration medium is substantially diminished as compared to its original flow rate.

The invention will now be described more fully hereinafter with reference to accompanying drawings, in which illustrative embodiments of the invention are shown. This invention, may however, be embodied in many different forms and should not be construed as limited to the embodiments set forth herein.

Figure 1A:
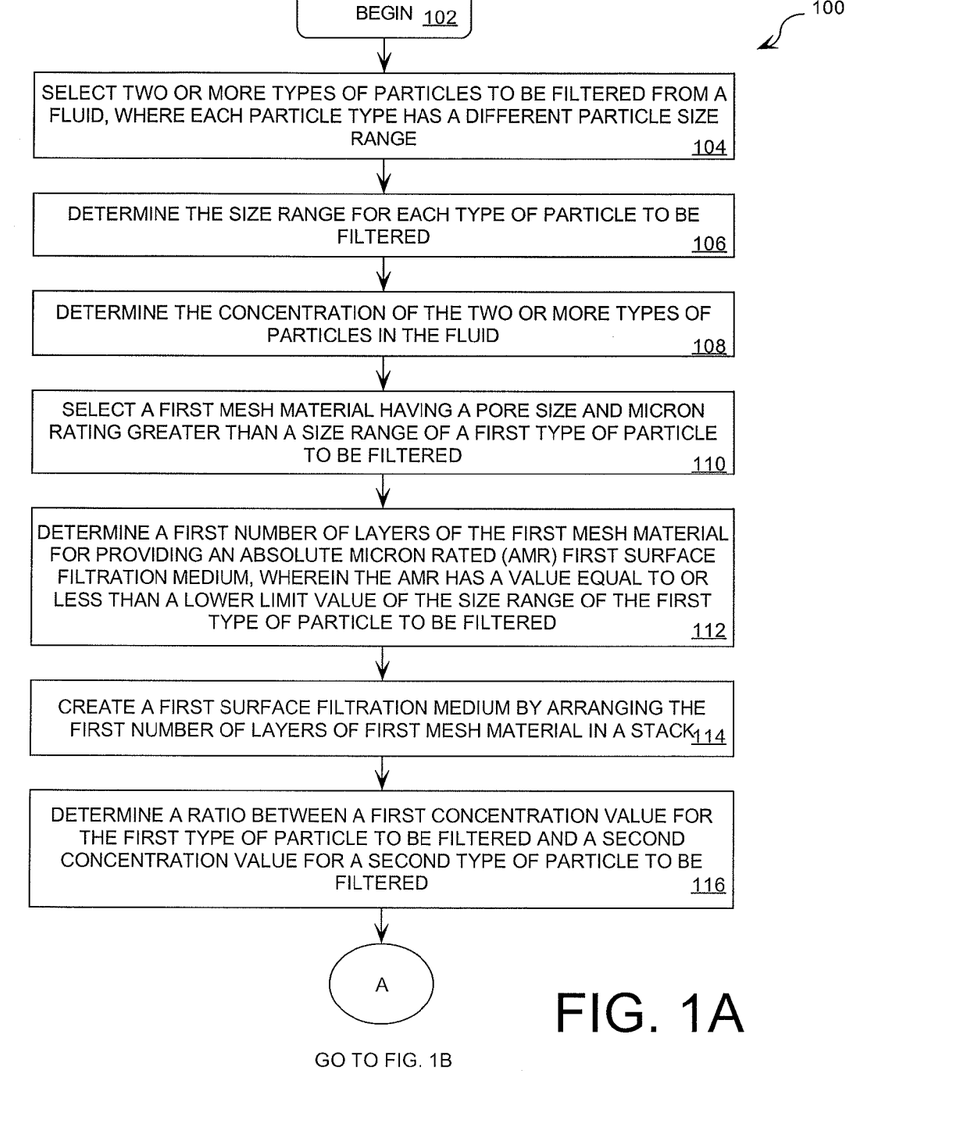
FIG. 1 is a flow diagram of a method for filtering a fluid including particles that is useful for understanding the present invention.

Referring now to FIG. 1A, there is provided a flow diagram of a method 100 for filtering a fluid including contaminant particles. As shown in FIG. 1, the method 100 begins at step 102 and continues with step 104. In step 104, two or more types of particles to be filtered (PTBF) from a fluid are selected. Each particle type has a different range of particle sizes. For example, a first particle type can have a particle size equal to one hundred fifty (150) microns+/−40 microns. A second particle type can have a particle size of thirty (30) microns+/−10 microns. Still, the invention is not limited in this regard. For example, the types of particles can be selected in accordance with an International Standard Code (ISO), such as ISO 4406.

After step 104, the method 100 continues with step 106. In step 106, the size range for each type of PTBF is determined. In step 108, the concentration of the PTBFs is determined. As should be understood, a fluid may contain different concentrations of the particle types. A concentration is determined for each particle type in step 108. Steps 106-108 are performed to obtain size and concentration values for use in designing a capacity based filter media (described below in relation to steps 110-116 of FIG. 1A, steps 118-124 of FIG. 1B and FIGS. 2-4).

Subsequent to completing step 108, the method 100 continues with step 110. In step 110, a first mesh material is selected. The first mesh material has a pore size and micron rating greater than a size of a first PTBF. Mesh materials are well known to persons skilled in the art, and therefore will not be described in detail herein. However, it should be appreciated that the first mesh material is a highly porous woven or non-woven mesh material. The highly porous woven or non-woven mesh material can be formed of a non-fiber shedding material. The first mesh material can be made from any suitable material that is temperature and fluid compatible with the filtering application to be carried out. For example, the first mesh material is made of a thermoplastic having polypropylene for low temperature filtering applications. Alternatively, the first mesh material is made of a thermoplastic having nylon for high temperature filtering applications. Still, the invention is not limited in this regard.

Referring again to FIG. 1A, the method 100 continues with step 112. In step 112, a first number of layers of the first mesh material is determined using the micron rating of the first mesh material selected in step 110. The first number of layers is selected to be sufficient in combination for providing a first surface filtration medium having a desired absolute micron rating (AMR). The first surface filtration medium will be described below in relation to step 114 of FIG. 1A and FIG. 2.

The desired AMR is selected to have a value less than or equal to the lower limit value of the size range of the first type of PTBF. However, the desired AMR can advantageously be achieved by using multiple layers of mesh with pores or apertures having sizes larger than the highest limit value of the size range of the first type of PTBF. The phrase "absolute micron rating" as used herein means that nearly one hundred percent (100%) of all particles larger than a stated micron size will be removed from a fluid being filtered.

Absolute micron ratings for various multilayer surface filtration mediums as described herein are listed in Table 1.

TABLE 1

| Micron Rating Of Mesh Material | Number of Mesh Material Layers | | | | | | | | | | |
|---|---|---|---|---|---|---|---|---|---|---|---|
| | 2 | 3 | 4 | 5 | 6 | 7 | 8 | 9 | 10 | 11 | 12 |
| 100 | 72.0 | 51.8 | 37.3 | 26.9 | 19.3 | 13.9 | 10.0 | 7.2 | 5.2 | 3.7 | 2.7 |
| 150 | 108.0 | 77.7 | 56.0 | 40.3 | 29.0 | 20.9 | 15.0 | 10.8 | 7.8 | 5.6 | 4.0 |
| 200 | 144.0 | 103.7 | 74.6 | 53.7 | 38.7 | 27.9 | 20.1 | 14.5 | 10.4 | 7.5 | 5.4 |
| 400 | 288.0 | 207.4 | 149.3 | 107.5 | 77.4 | 55.7 | 40.1 | 28.9 | 20.8 | 15.0 | 10.8 |
| 600 | 432.0 | 311.0 | 223.9 | 161.2 | 116.1 | 83.6 | 60.2 | 43.3 | 31.2 | 22.5 | 16.2 |

As illustrated in Table 1, the absolute micron rating achieved using the multi mesh layer as described is defined by: (a) a micron rating of a mesh material used to construct a surface filtration medium; and (b) the number of layers of mesh material used to form the surface filtration medium. For example, if a surface filtration medium is comprised of four (4) layers of a mesh material having a micron rating of four hundred (400), then an approximate value of the absolute micron rating of the surface filtration medium is computed using the following mathematical equation (1).

$$AMR = 0.72^{n-1} \cdot p \quad (1)$$

where AMR is an absolute micron rating, p is the pore size of each mesh layer, and n is the number of layers. Still, the invention is not limited in this regard.

Referring once again to step 112, a user can begin by selecting a preferred number of layers for the first surface filtration medium. Once the preferred number of layers is selected, the mathematical equation (1) or Table 1 can be used to determine the micron rating of a mesh material required in order to achieve a desired AMR for the first surface filtration medium. For example, if it is desired that the first surface filtration medium shall be comprised of four (4) layers, and an AMR of seventy-five (75) microns is desired, then Table 1 indicates that a mesh material having a micron rating of two hundred (200) should be chosen to form the first surface filtration medium. Such a selection will provide an AMR of seventy-four point six (74.6) microns.

Referring again to FIG. 1A, the method 100 continues with step 114. In step 114, a first surface filtration medium is formed by arranging the first number of layers of first mesh material in a stack. A schematic illustration of a first surface filtration medium 200 is provided in FIG. 2. In this example, the first number of layers is equal to two (2).

Figure 2:
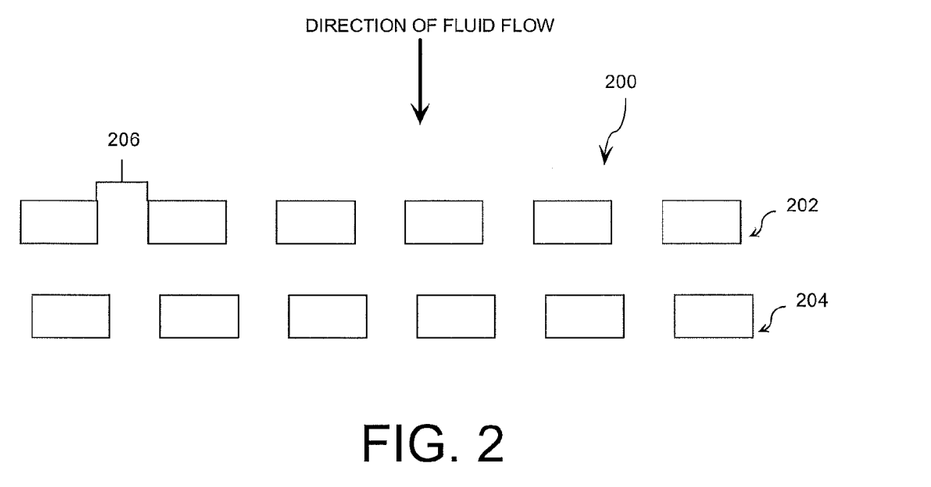
FIG. 2 is an enlarged cross-sectional view of a first surface filtration media that is useful for understanding the invention.

As shown in FIG. 2, the surface filtration medium 200 is formed of layers of a highly porous mesh material 202, 204. Although the surface filtration medium 200 of FIG. 2 includes two (2) layers of a mesh material, the invention is not limited in this regard. For example, the layers 202, 204 can include (a) two or more layers of a woven-mesh material, (b) two or more layers of the non-woven mesh material, or (c) two or more layers of a woven mesh material and a non-woven mesh material. As noted above, the exact number of layers is determined in step 112.

The multiple layers of mesh material 202, 204 advantageously provide a filtration material that has sufficient mechanical stability and strength so as to withstand the mechanical and hydraulic stresses to which the filtration material will be exposed when used in a high pressure filtration process. The multiple layers of mesh material 202, 204 also provide a surface filtration medium 200 with an increased surface area for collection of contaminants as compared to a filtration medium formed of a single layer of mesh material. It should be appreciated that the increased surface area is a three dimension (3D) surface area including a plurality of passages 206. In effect, the surface filtration medium also has: (a) a relatively high particle capacity as compared to conventional filtration mediums; (b) a relatively high fluid throughput as compared to conventional filtration mediums; and (c) an increased life expectancy as compared to conventional filtration mediums. It should be noted that the features (a) and (b) result from a direct interception of particles within the tortuous paths created by the misaligned pores of mesh material. The features (a) and (b) also result from a bridging of particles on the surface filtration medium. The term "bridging" as used herein refers to the collection of particles in a manner so as to form a bridge over a passage of a mesh material. Bridging is well known to persons skilled in the art, and therefore will not be described in great detail herein.

As shown in FIG. 2, the layers of a mesh material 202, 204 are not aligned with each other. Each layer of the mesh material 202, 204 has the same pore structure 206. This pore configuration advantageously provides a multilayer redundant architecture which achieves a desired AMR (described above in relation to step 112 of FIG. 1A) using a mesh material having a pore size that is substantially larger than the AMR to prevent blinding. Still, the invention is not limited in this regard. For example, the surface filtration medium can include layers of a mesh material that are aligned with each other.

Referring again to FIG. 1A, the method 100 continues with step 116. In step 116, a ratio is determined using a first and second concentration value obtained in step 108. The first concentration value denotes the amount of a first type of PTBF in a fluid to be filtered. The second concentration value denotes the amount of a second type of PTBF in the fluid to be filtered. The term "ratio" as used herein refers to a quantity that denotes the magnitude of a concentration of a first type of PTBF relative to a concentration of a second type of PTBF. The ratio can be calculated by dividing the first concentration value by the second concentration value. For example, if the first concentration value equals four (4) and the second concentration value equals eight (8), then the ratio is one to two (1:2). The ratio (1:2) indicates the there are twice as many particles of the second type than the first type in a fluid to be filtered.

Figure 1B:
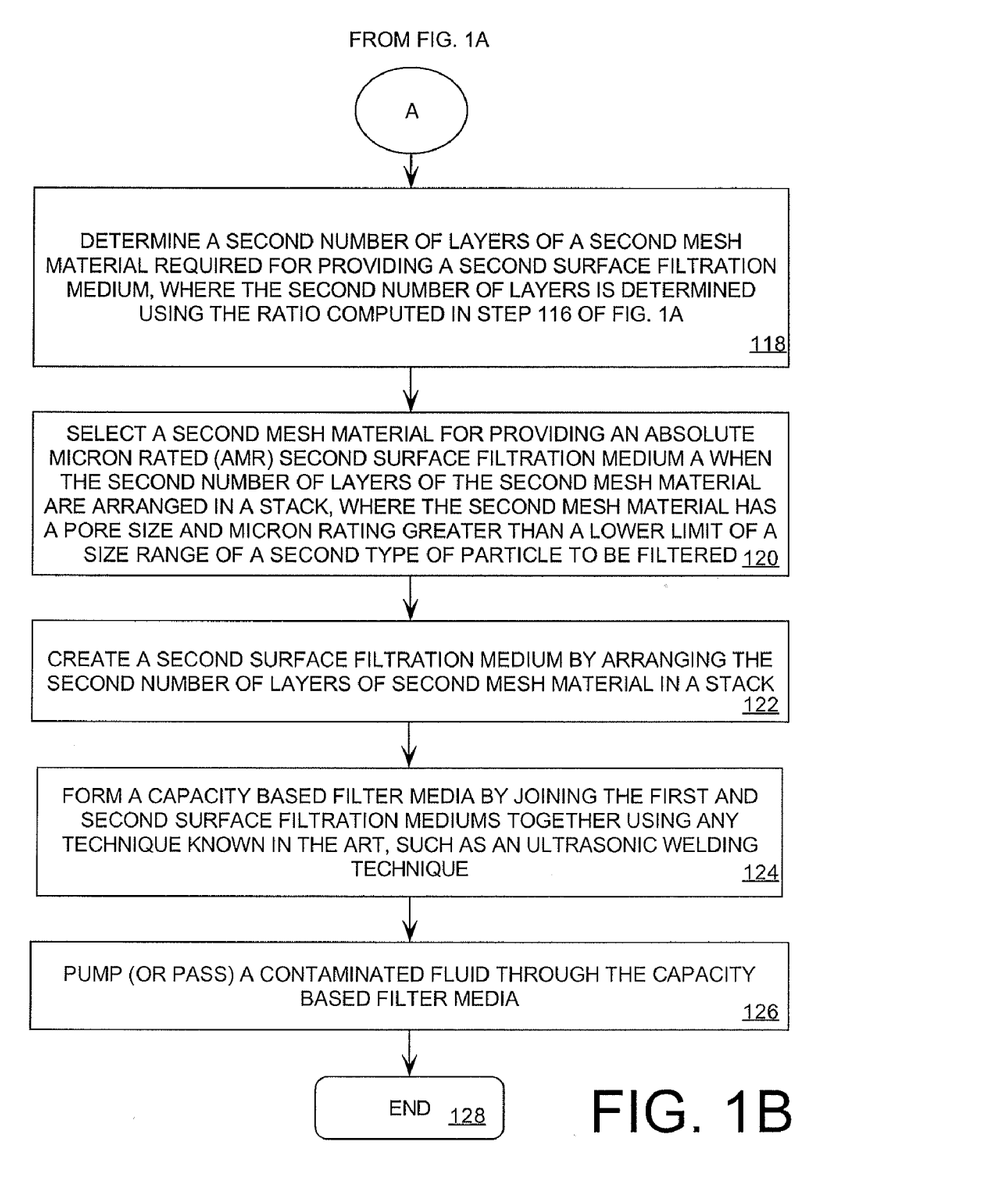

Referring again to FIG. 1A, the method 100 continues with step 118 of FIG. 1B. In step 118, a number of layers of a second mesh material is determined. The number of layers is selected to be sufficient in combination for providing a second surface filtration medium having a life expectancy approximately equal to a life expectancy the first surface filtration medium (described above in relation to step 114 of FIG. 1A and FIG. 2). Stated differently, the first and second surface filtration mediums will experience blinding at approximately the same point in time regardless of different concentrations of the first and second PTBF types in the fluid. As a result, the second surface filtration medium has a non-blinding time frame approximately equal to a non-blinding time frame of the first surface filtration medium. The phrase "non-blinding time frame" as used herein refers to the period of time during which blinding of a surface filtration media does not occur.

The number of layers of mesh material can be determined (a) using a known linear relationship between particle concentrations and life expectancies of multilayer surface filtration mediums, (b) using a known non-linear relationship between particle concentrations and life expectancies of multilayer surface filtration mediums, or (e) using known life expectancies of multilayer surface filtration mediums configured for filtering different types of PTBF and different concentrations of PTBF. The known life expectancies can be determined heuristically.

In many filtering applications, a linear relationship exists between particle concentrations and life expectancies of surface filtration mediums. In such a scenario, the number of layers of mesh material can be determined using the ratio computed in step 116 of FIG. 1A. For example, if the ratio is one to two (1:2), then the number of layers of a second mesh material is twice the number of layers of the first mesh material used to form the first surface filtration medium. In such a scenario, it should be appreciated that the capacity of each stack can be defined by the mathematical equation (2).

$$C_{stack} = C_L \cdot N \quad (2)$$

where $C_{stack}$ represents the capacity of a stack of mesh material, $C_L$ represents the capacity of a layer of mesh material, and N is the number of layers of mesh material in the stack. Still, the invention is not limited in this regard.

Referring again to FIG. 1B, the method 100 continues with step 120. In step 120, a second mesh material is selected for providing a second surface filtration medium having a desired absolute micron rating (AMR). The AMR of the second surface filtration medium is defined by the following mathematical equation (3).

$$AMR_2 = 0.72^{n-1} \cdot p \quad (3)$$

where $AMR_2$ is an absolute micron rating, p is the pore size of each mesh layer, and n is the number of layers. The second mesh material can be selected using Table 1 (described above in relation to step 110 of FIG. 1A) and the number of layers determined in step 118 of FIG. 1B. The second mesh material is also selected to have a pore size and micron rating greater than the highest limit value of the size range of the second type of PTBF. The second mesh material is further selected to be a highly porous woven or non-woven mesh material. The highly porous woven or non-woven mesh material can be formed of a non-fiber shedding material. The second mesh material can be made from any suitable material that is temperature and fluid compatible with the filtering application to be carried out.

After step 120, the method 100 continues with step 122. In step 122, a second surface filtration medium is formed by arranging the number of layers of second mesh material in a stack. A schematic illustration of a second surface filtration medium 300 is provided in FIG. 3.

Figure 3:
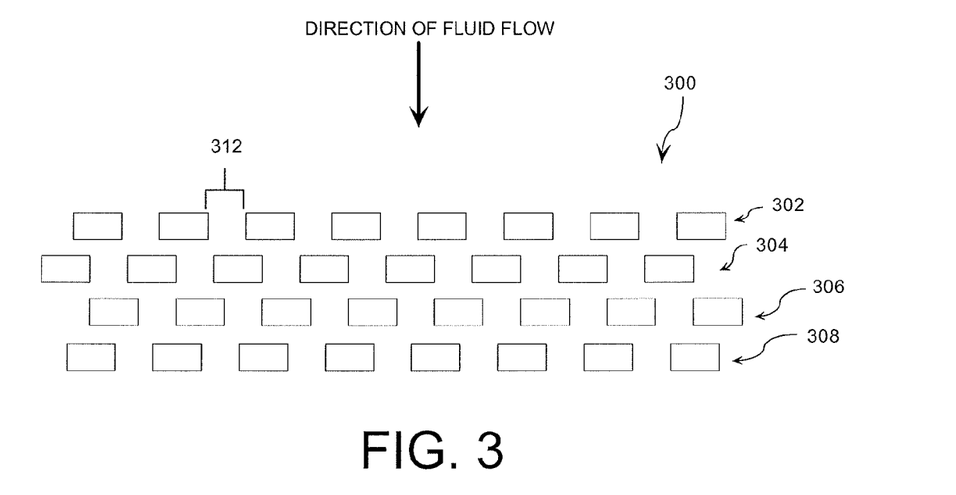
FIG. 3 is an enlarged cross-sectional view of a second surface filtration media that is useful for understanding the invention.

As shown in FIG. 3, the second surface filtration medium 300 is formed of layers of a highly porous mesh material 302, 304, 306, 308. Although the second surface filtration medium 300 of FIG. 3 includes four (4) layers of a mesh material, the invention is not limited in this regard. For example, the layers 302, 304, 306, 308 can include (a) two or more layers of a woven-mesh material, (b) two or more layers of the non-woven mesh material, or (c) two or more layers of a woven mesh material and a non-woven mesh material.

As shown in FIG. 3, the layers of a mesh material 302, 304, 306, 308 are not aligned with each other. Each layer of the mesh material 302, 304, 306, 308 has the same pore structure 312. This pore configuration advantageously provides a multilayer redundant architecture which achieves a desired AMR using mesh material having a pore size that is substantially larger than the AMR to prevent blinding. Still, the invention is not limited in this regard. For example, the surface filtration medium can include layers of a mesh material that are aligned with each other.

Figure 4:
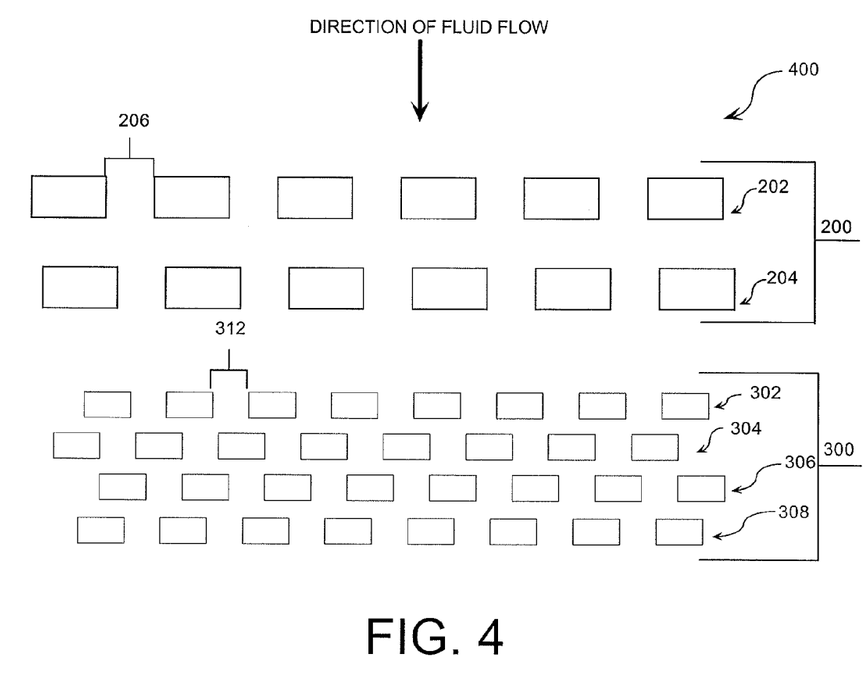
FIG. 4 is an enlarged cross-sectional view of a capacity based filter media that is useful for understanding the invention.

Referring again to FIG. 1B, the method 100 continues with step 124. In step 124, a capacity based filter media is formed by joining the first and second surface filtration mediums together using any suitable technique known in the art. Such techniques include, but are not limited to, an ultrasonic welding technique. Notably, the AMR of such a capacity based filter media is defined by the following mathematical equation (4).

$$AMR_{CBFM} = AMR_2 \quad (4)$$

where $AMR_{CBFM}$ is an absolute micron rating of the capacity based filter media and $AMR_2$ is the absolute micron rating of the second surface filtration medium. However, it should be understood that the AMR of a capacity based filter media can generally be defined by the following mathematical equation (5).

$$AMR_{CBFM} = AMR_N \quad (5)$$

where $AMR_{CBFM}$ is an absolute micron rating of a capacity based filter media and $AMR_N$ is the absolute micron rating of the outermost (or most downstream) surface filtration medium. As should be understood, the outermost (or most downstream) surface filtration medium has a pore size smaller than the pore sizes of the other surface filtration mediums used to form the capacity based filter media. A greatly enlarged side view of a capacity based filter media 400 is provided in FIG. 4.

Referring now to FIG. 4, the capacity based surface filtration media 400 is configured to filter a first and second type of PTBF from a fluid to be filtered. The fluid to be filtered has a larger concentration of the second type of PTBF than the first type of PTBF. Accordingly, the first surface filtration medium 200 has a first capacity for capturing particles of the first type. The second filtration medium 300 has a second capacity for capturing particles of the second type. The first and second capacities are unequal, thereby providing a capacity based surface filtration media 400 having surface filtration mediums 200, 300 with equal useful life expectancies.

It should be noted that the first type of PTBF has a size range larger than a size range of the second type of PTBF. Accordingly, the capacity based filter media 400 is formed by placing the second surface filtration medium 300 downstream from the first surface filtration medium 200. In effect, the capacity based filter media 400 has a graded or a tapered pore structure. The graded or tapered pore structure provides a capacity based filter media 400 whereby the pore size decreases in the direction of fluid flow. Still, the invention is not limited in this regard.

Referring again to FIG. 1B, the method 100 continues with step 126. In step 126, a contaminated fluid is pumped (or passed) transversely through the surfaces defined by the various layers. Thereafter, step 128 is performed where the method 100 ends.

Figure 5:
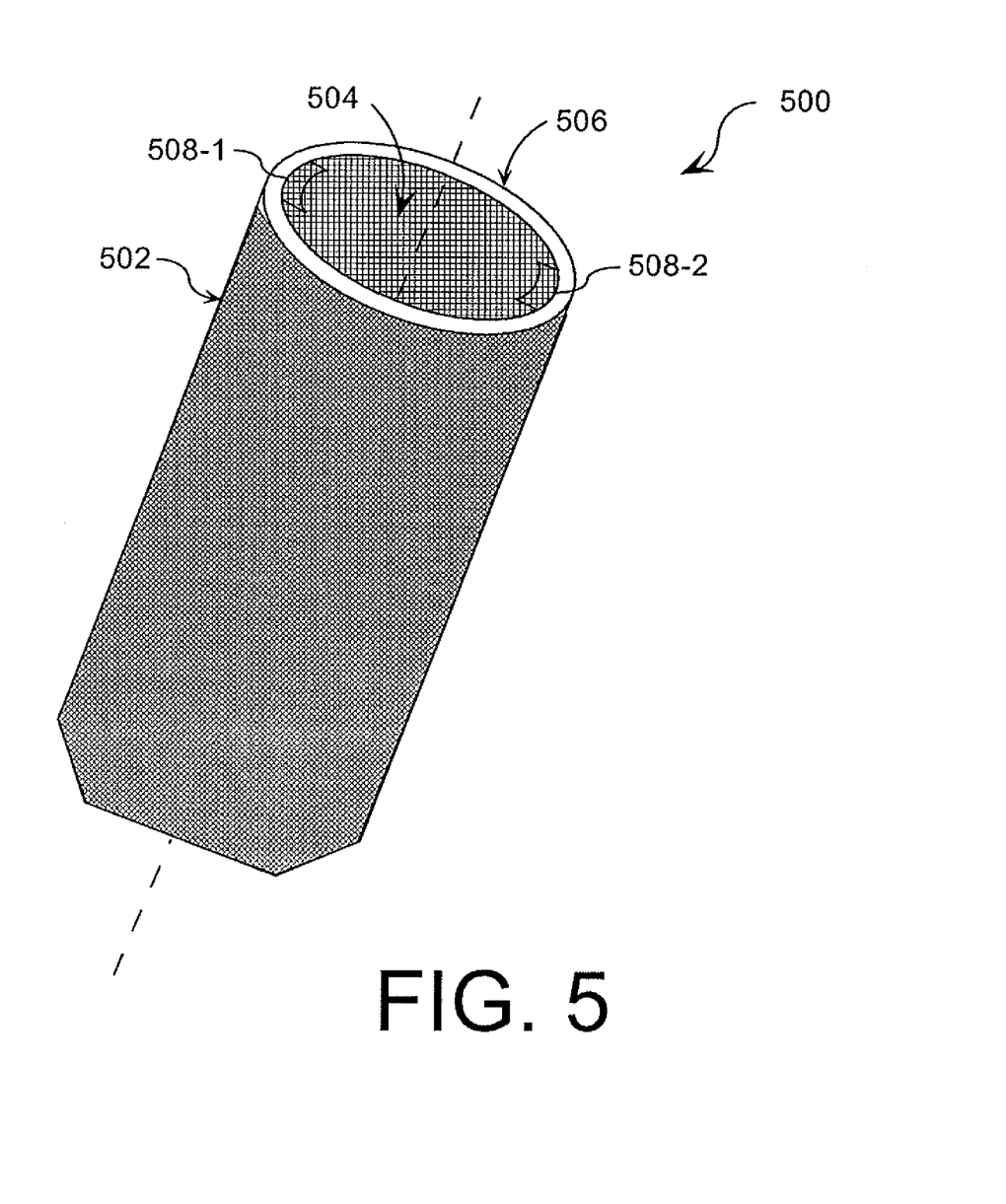
FIG. 5 is a perspective view of filter bag that is useful for understanding the present invention.

It should be noted that the above described method 100 can be implemented in a filter bag. An exemplary embodiment of a filter bag is provided in FIG. 5. As shown in FIG. 5, a filter bag 500 is comprised of a bag member 502, a ring member 506 and an input orifice 504. A contaminated fluid is pumped into the filter bag 500 through the input orifice 504. The fluid flows through the filter bag 500 to produce a filtered fluid. Such fluids include, but are not limited to, water, beverages, alcohols, pharmaceutical liquids, oils, cosmetic liquids and bio-fuels.

The bag member 502 is composed of a capacity based filter media. The capacity based filter media is the same as the capacity based filter media formed in step 124 of FIG. 1B. In this regard, it should be appreciated that the capacity based filter media is comprised of layers of a mesh material having a number of pores to control fluid flow. The layers of mesh material can have an identical pore structure or a graded (or tapered) pore structure. The graded or tapered pore structure provides a capacity based filter media whereby a pore size can decrease in the direction of fluid flow, i.e. from an input orifice 504 through the filter bag 500. The ring member 506 is comprised of one or more handles 508-1, 508-2. The ring member 506 is made of a semi-rigid material, such as a thermoplastic.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

I claim:

1. A method for filtering a fluid with unequal concentrations of different types of particles having known size ranges, comprising the steps of:
    using a first surface filtration medium to capture a first type of said particles having a first size range exclusively on first respective surfaces of a first plurality of discrete layers of a first mesh material arranged in a first stack;
    using in combination a pore size of said first mesh material and a first number of said discrete layers in said first stack to provide a first absolute micron filter rating;
    using a second surface filtration medium downstream of said first surface filtration medium to capture a second type of said particles having a second size range different from said first size range exclusively on second respective surfaces of a second plurality of discrete layers of a second mesh material arranged in a second stack;
    using in combination a pore size of said second mesh material and a second number of said discrete layers in said second stack to provide a second absolute micron filter rating different from said first absolute micron filter rating;
    selecting a first number of said first plurality of discrete layers to provide a first capacity of said first surface filtration medium for collecting said first type of particles, and a second number of said second plurality of discrete layers to provide a second capacity of said second surface filtration medium for collecting said second type of particles;
    selecting said first number and said second number to provide a ratio of said first capacity and said second capacity which is approximately equal to a ratio of a relative concentration of said first type of particle to a relative concentration of said second type of particle; and
    selecting said first pore size larger than said first size range of particles, and said second pore size larger than said second size range of particles.

2. The method according to claim 1, further comprising the step of selecting said first number of said discrete layers n to satisfy a mathematical equation $AMR = 0.72^{n-1} \cdot p$, where AMR is said first absolute micron rating, and p is said pore size of said first mesh material.

3. The method according to claim 1, further comprising the step of selecting said pore size of said first mesh material to be larger than said first absolute micron filter rating.

4. The method according to claim 1, further comprising selecting said first absolute micron filter rating to have a value less than or equal to a lowest limit value of said first size range.

5. The method according to claim 1, further comprising the step of selecting said second absolute micron filter rating to have a value less than or equal to a lowest limit value of said second size range.

6. The method according to claim 1, further comprising the step of selecting said pore size of said first mesh material to be larger than said pore size of said second mesh material.

7. A method for designing a filter for fluids having unequal concentrations of different types of particles, comprising the steps of:
    determining relative concentrations of at least a first type particle and a second type particle, each having different size ranges,
    assembling a first surface filtration medium capable of capturing said first type of said particles having a first size range exclusively on first respective surfaces of a first plurality of discrete layers of a first mesh material arranged in a first stack;
    assembling a second surface filtration medium downstream of said first surface filtration medium, and capable of capturing said second type of said particles having a second size range exclusively on second respective surfaces of a second plurality of discrete layers of a second mesh material arranged in a second stack;
    choosing in combination a pore size of said first mesh material and a first number of said discrete layers in said first stack to provide a first absolute micron filter rating;
    choosing in combination a pore size of said second mesh material and a second number of said discrete layers in said second stack first to provide a second absolute micron filter rating different from said first absolute micron filter rating;
    selecting a first number of said first plurality of discrete layers to provide a first capacity of said first surface filtration medium for collecting said first type of particles, and a second number of said second plurality of discrete layers to provide a second capacity of said second surface filtration medium for collecting said second type of particles;
    selecting said first number and said second number to provide a ratio of said first capacity and said second capacity which is approximately equal to a ratio of a relative concentration of said first type of particle to a relative concentration of said second type of particle; and
    selecting said first pore size larger than said first size range of particles, and said second pore size larger than said second size range of particles.

8. The method according to claim 7, further comprising the step of selecting said first number of said discrete layers n to satisfy a mathematical equation $AMR=0.72^{n-1} \cdot p$, where AMR is said first absolute micron rating, and p is said pore size of said first mesh material.

9. The method according to claim 7, further comprising the step of selecting said pore size of said first mesh material to be larger than said first absolute micron filter rating.

10. The method according to claim 7, further comprising selecting said first absolute micron filter rating to have a value less than or equal to a lowest limit value of said first size range.

11. The method according to claim 7, further comprising the step of selecting said second absolute micron filter rating to have a value less than or equal to a lowest limit value of said second size range.

12. The method according to claim 7, further comprising the step of selecting said pore size of said first mesh material to be larger than said pore size of said second mesh material.

13. A method for filtering a fluid with unequal concentrations of particles having known size ranges, comprising the steps of:
selecting a first surface filtration medium for capturing a first size range of particles to include a first plurality of discrete layers of a first mesh material exclusively configured to capture particles on its surface, and arranged in a first stack;
selecting a second surface filtration medium for capturing a second size range of particles downstream of said first surface filtration medium, said second size range different from said first size range of particles, and said second surface filtration medium selected to include a second plurality of discrete layers of a second mesh material which is exclusively configured to capture particles on its surface, and arranged in a second stack immediately downstream of said first stack;
selecting said first stack to include in combination a first number of said discrete layers of said first mesh material and a first pore size of said first mesh material, to provide said first stack with a first absolute micron filter; and
selecting said second stack to include in combination a second number of said discrete layers of said second mesh material different from said first number of layers and a second pore size of said second mesh material, to provide said second stack with a second absolute micron filter rating different from said first absolute micron filter rating;
selecting a first number of said first plurality of discrete layers to provide a first capacity of said first surface filtration medium for collecting said first type of particles, and a second number of said second plurality of discrete layers to provide a second capacity of said second surface filtration medium for collecting said second type of particles;
selecting said first and said second number to provide a ratio of said first capacity and said second capacity which is approximately equal to a ratio of a relative concentration of said first type of particle in said first size range and a relative concentration of said second type of particle in said second size range; and
selecting said first pore size larger than said first size range of particles, and said second pore size larger than said second size range of particles.

14. The method according to claim 13, further comprising the step of selecting said first number of said discrete layers n to satisfy a mathematical equation $AMR=0.72^{n-1} \cdot p$, where AMR is said first absolute micron rating, and p is said pore size.

15. The method according to claim 13, further comprising the step of selecting said first pore size to be larger than said first absolute micron filter rating.

16. The method according to claim 13, further comprising the step of selecting said first absolute micron filter rating to have a value less than or equal to a lowest limit value of said first size range.

17. The method according to claim 13, further comprising the step of selecting said second absolute micron filter rating to have a value less than or equal to a lowest limit value of said second size range.

18. The method according to claim 13, further comprising the step of selecting a pore size of said first mesh material to be larger than a pore size of said second mesh material.

19. A method for constructing a filter for a fluid containing a first type of particle having a first particle size range, and a second type of particle having a second particle size range, comprising:
selecting a preferred first number of discrete layers for inclusion in a first stack forming a first filtration medium;
selecting for said first number of discrete layers a first mesh material which has a first pore size that is greater than said first particle size range, and which provides said first filtration medium with a first absolute micron rating that is less than said first particle size range;
selecting for a second filtration medium a second mesh material having a second pore size greater than said second particle size range,
selecting a second number of discrete layers of said second mesh material for inclusion in a second stack forming said second filtration medium to provide a ratio of said first number to said second number that is approximately equal to a ratio between a first concentration of said first type of particle and a second concentration of said second type of particle;
selecting said second pore size based on said second number of discrete layers to provide said second surface filtration medium with a second absolute micron rating less than said second particle size range.

* * * * *